(12) United States Patent
King

(10) Patent No.: US 7,928,922 B2
(45) Date of Patent: Apr. 19, 2011

(54) SYSTEM AND METHOD FOR PROVIDING A LOW AND NARROW-PROFILE RADIO FREQUENCY IDENTIFICATION (RFID) TAG

(76) Inventor: Patrick F. King, Simpsonville, SC (US)

( * ) Notice: Subject to any disclaimer, the term of this patent is extended or adjusted under 35 U.S.C. 154(b) by 0 days.

(21) Appl. No.: 12/641,907

(22) Filed: Dec. 18, 2009

(65) Prior Publication Data

US 2010/0127876 A1 May 27, 2010

Related U.S. Application Data

(62) Division of application No. 11/771,600, filed on Jun. 29, 2007, now Pat. No. 7,659,857.

(60) Provisional application No. 60/818,754, filed on Jul. 5, 2006, provisional application No. 60/822,785, filed on Aug. 18, 2006, provisional application No. 60/894,499, filed on Mar. 13, 2007.

(51) Int. Cl.
*H01Q 9/28* (2006.01)

(52) U.S. Cl. ............ 343/795; 343/702; 340/572.7; 340/572.8

(58) Field of Classification Search .......... 343/702, 343/795, 806, 873, 895; 340/572.1, 572.7, 340/572.8
See application file for complete search history.

(56) References Cited

U.S. PATENT DOCUMENTS

| | | | |
|---|---|---|---|
| 1,867,152 A | 7/1932 | Higgins | |
| 2,156,466 A | 5/1939 | Vogt | |
| 2,828,848 A | 4/1958 | Symonds | |
| 3,001,906 A | 9/1961 | Capella et al. | |
| 5,347,280 A | 9/1994 | Schuermann | |
| 5,922,550 A | 7/1999 | Everhart et al. | |
| 6,166,638 A | 12/2000 | Brady et al. | |
| 6,424,263 B1 | 7/2002 | Lee et al. | |
| 6,441,740 B1 | 8/2002 | Brady et al. | |
| 6,630,910 B2 | 10/2003 | Forster et al. | |
| 6,836,253 B2 * | 12/2004 | Strache et al. | 343/713 |
| 6,914,562 B2 | 7/2005 | Forster | |
| 6,978,668 B2 * | 12/2005 | Starinshak | 73/146 |
| 6,999,028 B2 | 2/2006 | Egbert | |
| 7,042,413 B2 | 5/2006 | Mazoki et al. | |
| 7,050,017 B2 | 5/2006 | King et al. | |
| 7,055,754 B2 | 6/2006 | Forster | |
| 7,064,668 B2 | 6/2006 | Porad | |
| 7,205,898 B2 | 4/2007 | Dixon et al. | |
| 7,619,576 B2 * | 11/2009 | Beckley et al. | 343/718 |
| 7,659,857 B2 * | 2/2010 | King | 343/702 |
| 2004/0159383 A1 * | 8/2004 | Adamson et al. | 152/152.1 |
| 2006/0109124 A1 | 5/2006 | Dixon et al. | |
| 2006/0220866 A1 | 10/2006 | Dixon et al. | |
| 2006/0220867 A1 | 10/2006 | Dixon et al. | |
| 2007/0173886 A1 | 7/2007 | Rousso et al. | |

* cited by examiner

*Primary Examiner* — Tho G Phan
(74) *Attorney, Agent, or Firm* — Withrow & Terranova, PLLC

(57) ABSTRACT

Methods and systems for wireless devices are disclosed. According to one system, a radio frequency identification (RFID) tag includes an RFID circuit packaged within a chip carrier package. The chip carrier package bonds out a first antenna connection for the RFID circuit. An antenna including a conductive lead is interfaced with the first antenna connection. The chip carrier package and the first conductive lead are coupled to a first side of a first spacer. A second spacer having a second dielectric constant greater than the first dielectric constant is coupled to a second side of the first spacer. The second spacer isolates the RFID circuit from a metal surface.

20 Claims, 10 Drawing Sheets

SYSTEM AND METHOD FOR PROVIDING A LOW AND NARROW-PROFILE RADIO FREQUENCY IDENTIFICATION (RFID) TAG

RELATED APPLICATIONS

The present application is a divisional patent application of U.S. patent application Ser. No. 11/771,600, filed Jun. 29, 2007, entitled "SYSTEM AND METHOD FOR PROVIDING A LOW AND NARROW-PROFILE RADIO FREQUENCY IDENTIFICATION (RFID) TAG," which is incorporated herein by reference in its entirety.

U.S. patent application Ser. No. 11/771,600 claims priority to and claims the benefit of U.S. Provisional Application Ser. Nos. 60/818,754, entitled "MINI-METAL TAG AND RAPID WRAP RFID," filed on Jul. 5, 2006; 60/822,785, entitled "MINI-METAL TAG AND RAPID WRAP RFID," filed on Aug. 18, 2006; and 60/894,499, entitled "MINI-METAL RADIO FREQUENCY IDENTIFICATION (RFID) TAG WITH FLEX-SET," filed on Mar. 13, 2007, all of which are incorporated herein by reference in their entirety.

FIELD OF THE INVENTION

The present invention relates to wireless communication device tag technology, and particularly to low and narrow-profile radio frequency identification (RFID) tags having a small form factor which are capable of use on a metal surface in forms adapted to attach on articles of manufacture and are protected from environmental conditions.

BACKGROUND OF THE INVENTION

Radio Frequency Identification (RFID) technology is useful for identifying goods and articles of manufacture. RFID systems are commonly used in inventory or shipping processes to track such goods. RFID technology utilizes RFID devices which are physically placed on an item to be tagged. The RFID devices are based on either passive or active technology. Active RFID devices are powered devices that actively transmit a signal including an identifier that is associated with the tagged item. Passive RFID devices do not include power supplies and, as such, do not actively transmit a signal. Instead, passive RFID devices rely on electrical field energy provided by an RFID interrogator within an incoming RFID wave to power up electronics, including a passive RFID device and an associated antenna. The passive RFID device and the associated antenna rely upon use of a physical wave propagation phenomenon called "backscatter," by which waves are reflected back toward a source. As such, a passive RFID device interrupts and reflects an incoming RFID signal back to the RFID interrogator to communicate identification information rather than driving power transmitter electronics.

RFID signals are relatively low-power signals which do not propagate through open spaces beyond a few meters. Metal or other reflective surfaces also tend to interfere with the propagation of RFID signals. Until the recent advent of RFID insulating materials, RFID tags could not be used on metal surfaces. However, even with this advancement, large form factors are required to sufficiently shield the RFID devices from the metal surface, particularly for passive RFID devices which use backscatter reflection communication techniques. Additionally, conventional RFID devices are large and often damaged when directly attached to objects which are shipped or stored without a carton or container.

Accordingly, there exists a need to provide low and narrow-profile RFID tags having a small form factor which are capable of use on a metal surface, are adapted to attach easily onto goods to be tracked in their natural environment, and are able to be used without damage to the RFID tag, and are protected from environmental conditions.

SUMMARY OF THE INVENTION

The present invention relates to a system and method of providing a low and narrow-profile RFID tag (hereinafter the "RFID tag") with a small form factor which is capable of use on a metal surface. Due to the small form factor, the RFID tags of the present invention may be placed onto and conform to surfaces more readily than conventional RFID devices and may be used within a variety of harsh environmental conditions. A magnetic material with a relatively high dielectric constant forms a foundation layer for the RFID tag. An insulating layer with a relatively low dielectric constant is applied to the foundation layer, an RFID tag is placed on the insulating layer, and a dipole antenna is constructed over the insulating layer. The RFID tag is adapted to be used on a metal surface and to provide a read range suitable for typical RFID-based applications. The RFID tag may be attached to the metal surface in a variety of ways, such as by tape, strapping, or other fasteners.

In an alternative embodiment, the low and narrow-profile RFID tag is mounted on a circuit board. Pads on the circuit board are provided for solder connections to the RFID chip. Additionally, pads are provided on the circuit board for solder connection of the dipole antenna. The solder pads for the dipole antenna form mechanical and electrical bonding locations for the dipole antenna.

In an alternative embodiment, an environmental encapsulate is used to cover at least a portion of the low and narrow-profile RFID tag to protect it from environmental conditions. The environmental encapsulate may shield the low and narrow-profile RFID tag from contaminants, water, temperature, and impact. The environmental encapsulate may be, for example, shrink wrap, direct molded material, vulcanized rubber, or a pre-mold case.

Several attachment and encapsulation embodiments are possible which allow the RFID tags of the present invention to be placed onto uneven or curved surfaces. Certain of the embodiments increase flexibility and shape retention of the RFID tags to improve attachment capabilities by reducing stress on fasteners. Other embodiments include attachment members as part of the RFID tag itself to ease in the attachment to and removal from objects to be identified. Other embodiments provide increased protection of the RFID tags from environmental conditions. The RFID tags of the present invention provide a natural fit to the item the RFID tag is attached to and provide a resilient member for increased environmental protection.

In an alternate embodiment, the low and narrow-profile RFID tag may be attached to a cylindrical or tubular surface using a rapid wrap technology. The rapid wrap technology utilizes a rolled flexible cylindrical material with the RFID tag fastened to the inside of the rolled flexible cylindrical material. The rolled flexible cylindrical material is unrolled and applied to the round surface and may be retained by the memory reflex of the rolled flexible cylindrical material. The rolled flexible cylindrical material may be further secured to the round surface by a faster such as tape, strapping, or other fasteners.

An alternate embodiment provides a low and narrow-profile RFID tag with curve set capabilities that preserves its shape when bent or formed to match contours of a mounting surface. By independently maintaining the shape of the surface to which it is attached, the RFID tag with curve set capabilities produces less strain on mechanical fastening systems such as straps, glue, or others, that hold the tag to the surface. As such, the RFID tag with curve set capabilities may be used in a variety of industrial, construction, and other environments to tag objects with both flat and uneven surfaces. For example, the RFID tag with curve set capabilities may be formed by coupling a RFID tag to at least one wire to form a reinforced RFID tag. The RFID tag may be coupled to the wire by use of double-sided tape or any other suitable material that provides a flexible medium between the wire and the RFID tag. The wire gauge is selected such that the reinforced RFID tag preserves its shape when bent, even when coupled to the RFID tag with curve set capabilities.

In yet an alternate embodiment, a low and narrow-profile RFID tag is placed behind and coupled to a rigid angular or rectangular frame to improve impact resilience of the RFID tag. The frame is made of a material such as metal (e.g., steel or aluminum) capable of impact resistance. Slots are cut approximately perpendicular to the length of the rigid frame to reduce RFID shielding of the frame. The slots may be cut at intervals along a portion of the length of the frame to allow a useable RFID signal level and read performance for the RFID tag when placed within a void (e.g., on the underside or backside) of the frame material. The RFID tag is then placed within a void of the frame and fastened to the frame by glue or another type of fastener.

In an alternate embodiment, a slot or hole may be cut in the low and narrow-profile RFID tag to allow it to be fastened to a mounting surface independently of the frame. Furthermore, one or more slots may be cut axially with respect to the length of the frame base to allow the frame to be fastened with a strap or straps to the mounting surface. The RFID tag may further be attached to the frame via any suitable means, such as a metal or fiber strap, or glue. The frame may be attached to the mounting surface by direct welding, metal or fiber straps as described above, a rugged tape of belts, or any other fastener suitable for use with the mounting surface.

In an alternate embodiment, a vulcanized rubber encapsulation of the low and narrow-profile RFID tag is provided to provide a ruggedized RFID tag capable of providing impact resistance and environmental isolation for the RFID tag. The ruggedized RFID tag is formed by placing at least one layer of pre-cured rubber within a mold, placing the RFID tag on the pre-cured rubber, and placing at least one additional layer of the pre-cured rubber on top of the RFID tag. The process continues by heating the layers of rubber and the RFID tag to bond the layers of rubber together to form a vulcanized rubber encapsulation of the RFID tag under the pressure of the sealed mold. This vulcanized rubber encapsulation of the RFID tag is ruggedized and flexible such that it may be bent to conform to and be placed upon a contoured or uneven surface. The ruggedized RFID tag provides impact resistance and the sealed vulcanized rubber provides additional protection from water penetration or other environmental compromise of the encapsulated RFID tag.

In an alternate embodiment, an o-ring may be integrated into the vulcanized low and narrow-profile RFID tag of the previous embodiment to ease attachment and removal of the RFID tag to and from the item to be identified. This integrated o-ring is provided by placing an o-ring within the mold during fabrication of the vulcanized rubber encapsulation of the RFID tag. This o-ring provides mechanical strapping capabilities for fastening the vulcanized RFID tag to a product, such as a pipe. By integrating the o-ring into the vulcanized RFID tag during manufacture, a fastening system is mechanically-bonded to the vulcanized RFID tag. This vulcanized RFID tag with integrated o-ring provides for efficient installation and removal of the vulcanized RFID tag and provides for ease of reuse of the vulcanized RFID tag.

In an alternate embodiment, reinforced pre-hardened rubber strips are integrated into a vulcanized low and narrow-profile RFID tag to provide additional impact protection.

A "ring tag" embodiment is also provided which encapsulates a low and narrow-profile RFID tag within a ring-shaped encapsulate. The ring-shaped encapsulate is sized according to the dimensions of the item to be tagged. The ring-shaped encapsulate is stretchable to allow it to be placed over the item to be tagged and has enough surface resistance to allow it to resist movement along the surface of the item to prevent it from falling off of the item to be tagged. The low and narrow-profile RFID ring tag may additionally be attached to the surface in a variety of ways, such as by tape, strapping, or other fasteners.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
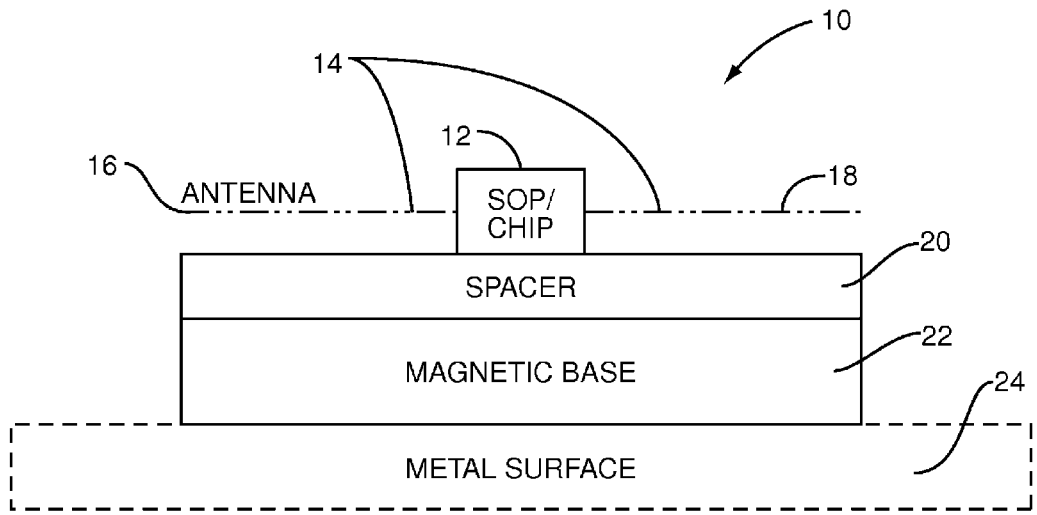
FIG. 1 illustrates an exemplary chip carrier package embodiment of a low and narrow-profile radio frequency identification (RFID) device according to an embodiment of the subject matter described herein.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method of providing a low and narrow-profile RFID tag (hereinafter the "RFID tag") with a small form factor which is capable of use on a metal surface. Due to the small form factor, the RFID tags of the present invention may be placed onto and conform to surfaces more readily than conventional RFID devices and may be used within a variety of harsh environmental conditions. A magnetic material with a relatively high dielectric constant forms a foundation layer for the RFID tag. An insulating layer with a relatively low dielectric constant is applied to the foundation layer, an RFID tag is placed on the insulating layer, and a dipole antenna is constructed over the insulating layer. The RFID tag is adapted to be used on a metal surface and to provide a read range suitable for typical RFID-based applications.

In alternative embodiments, the low and narrow-profile RFID tag is mounted on a circuit board and/or an environmental encapsulate is used to cover at least a portion of the low and narrow-profile RFID tag to protect it from environmental conditions. It should be noted that the environmental encapsulate may be used to protect any wireless communication electronics, and that the environmental encapsulate is not limited to use with an RFID tag. A circuit board for the RFID tag provides mechanical integrity for circuit connections, while environmental encapsulate embodiments may shield the low and narrow-profile RFID tag from contaminants, water, temperature, and impact. The environmental encapsulate may be, for example, shrink wrap, a pre-molded case, a slotted rigid angular or rectangular frame, vulcanized rubber, or reinforced pre-hardened rubber strips integrated into vulcanized rubber. Other environmental encapsulates are possible and all are considered within the scope of the subject matter described herein.

Several attachment and encapsulation embodiments are possible which allow the RFID tags of the present invention to be placed onto uneven or curved surfaces. Certain of the embodiments increase flexibility and shape retention of the RFID tags to improve attachment capabilities by reducing stress on fasteners. Other embodiments include attachment members as part of the RFID tag itself to ease attachment to and removal from objects to be identified. Other embodiments provide increased protection of the RFID tags from environmental conditions. The RFID tags of the present invention provide a natural fit to the item the RFID tag is attached to and provide a resilient member for increased environmental protection. As an example, a rapid wrap rolled flexible cylindrical material may be used with the RFID tag fastened to the inside of the rolled flexible cylindrical material for application of the RFID tag to round surfaces. Additionally, curve set capabilities may be used to allow the RFID tag to preserve its shape when bent or formed to match contours of a mounting surface. For example, the RFID tag with curve set capabilities may be formed by coupling a RFID tag to at least one wire to form a reinforced RFID tag with curve set capabilities. An o-ring may be integrated into a vulcanized low and narrow-profile RFID tag by placing an o-ring within a mold during fabrication of the vulcanized rubber encapsulation of the RFID tag. Alternatively, a "ring tag" embodiment is also provided which encapsulates a low and narrow-profile RFID tag within a ring-shaped encapsulate. The ring-shaped encapsulate is sized according to the dimensions of the item to be tagged. The low and narrow-profile RFID ring tag may additionally be attached to the surface in a variety of ways, such as by tape, strapping, or other fasteners. Other fastening embodiments are possible and all are considered within the scope of the subject matter described herein.

FIG. 1 illustrates an exemplary chip carrier package embodiment of a low and narrow-profile radio frequency identification (RFID) tag (hereinafter the "RFID tag") 10. The low and narrow-profile RFID tag 10 includes a chip carrier package 12, which includes RFID electronics for providing RFID identification signals when interrogated by a reader (see FIG. 9 below). The chip carrier package 12 provides environmental protection for the RFID electronics. The chip carrier package 12 may be, for example, a small-outline package (SOP) for an electronic circuit. Details of SOP package specifications are published, for example, by the JEDEC Solid State Technology Corporation (hereafter "JEDEC"), of Arlington, Va., and are available at www.jedec.org. The SOP package is generally defined by JEDEC as a package whose chip cavity area occupies a major fraction of the package area. A variety of terminal and lead arrangements are available with an SOP package. RFID electronics have not been previously known to have been packaged within an SOP-style chip carrier package. Benefits of packaging the RFID electronics within the SOP-style chip carrier package include a substantially reduced form factor for the RFID tag 10 relative to conventional RFID devices. Additionally, the small form factor of the SOP-style chip carrier package provides for improved conformity of the RFID tag 10 with uneven surfaces.

A dipole antenna 14 provides wave propagation capabilities to the RFID electronics within the chip carrier package 12. The dipole antenna 14 is a symmetrical dipole antenna tuned for the frequency of propagation within a given RFID system. However, the dipole antenna 14 may be an asymmetrical dipole antenna or a monopole antenna without departure from the scope of the subject matter described herein. Tuning of the dipole antenna 14 may be performed by adjusting the length of each of a left side 16 and a right side 18 of the dipole antenna 14 to be an appropriate fraction of or multiple of a usable wave length within a given RFID system.

The chip carrier package 12 and the dipole antenna 14 are shown mounted or attached to a spacer material 20. The spacer material 20 is shown attached to a magnetic-base material 22. The spacer material 20 and the magnetic-base material 22 work in conjunction to form an isolation barrier between RFID electronics within the chip carrier package 12 and the dipole antenna 14 relative to a metal surface 24 upon which the low and narrow-profile RFID tag 10 is mounted. The spacer material 20 and the magnetic-base material 22 may be separate layers of material or may be constructed as one layer with a dielectric constant gradient that increases in the direction of the metal surface 24. Additionally, the spacer material 20 and the magnetic-base material 22 may be fabricated together as two materials having a low dielectric constant and a high dielectric constant, respectively. An exemplary commercially-available material that may be used for the spacer material 20 and the magnetic-base material 22 is ECCOsorb®, sold by Emerson and Cuming Microwave Products of Randolph, Mass. Additionally, U.S. Pat. No. 7,205,898, entitled "RFID TAGS," to Dixon et al. describes materials that may be used for the spacer material 20 and the magnetic-base material 22. U.S. Pat. No. 7,205,898 is incorporated by reference in its entirety as if fully set forth herein.

Figure 2:
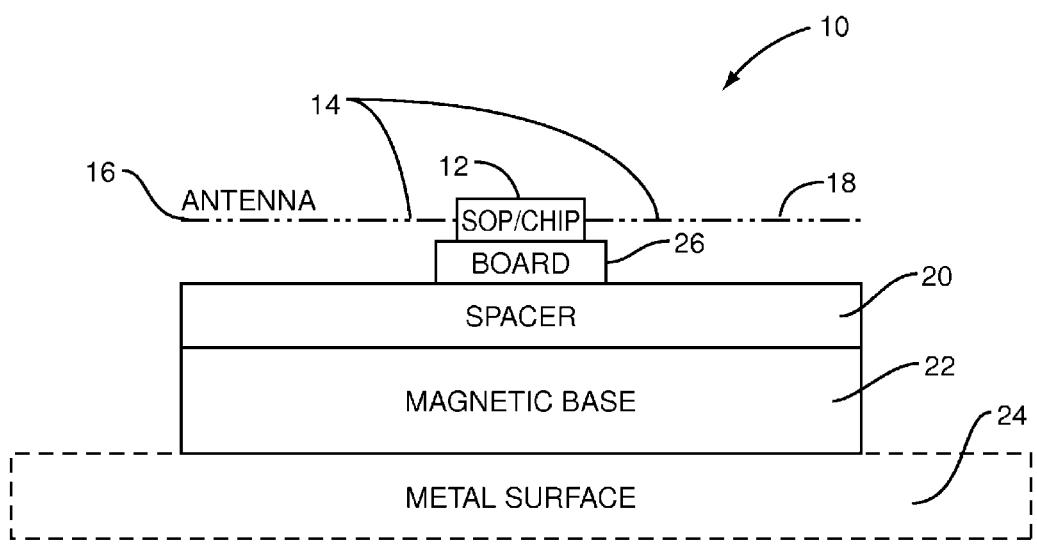
FIG. 2 illustrates a circuit board-mounted version of the low and narrow-profile RFID device of FIG. 1.

FIG. 2 illustrates an exemplary chip carrier package embodiment of the low and narrow-profile RFID tag 10 where the chip carrier package 12 and the dipole antenna 14 are mounted on a circuit board 26. The circuit board 26 provides a rigid mounting surface for the chip carrier package 12, including the RFID electronics described in association with FIG. 9 below, and provides solder connection pads for the dipole antenna 14. The use of the circuit board 26 may improve mechanical integrity of external antenna connections to the RFID tag 10. The use of the circuit board 26 provides mechanical integrity to the circuit connections between the chip carrier package 12 and the dipole antenna 14.

Figure 3:
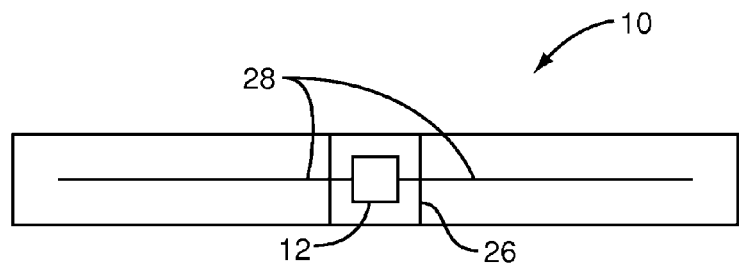
FIG. 3 illustrates an exemplary top view of the low and narrow-profile RFID device illustrated in FIG. 2.

FIG. 3 illustrates an exemplary top view of a chip carrier package embodiment of the low and narrow-profile RFID tag 10 where the dipole antenna 14 includes a dipole wire antenna 28. The dipole wire antenna 28 may be dimensioned of an appropriate gauge to provide adequate signal propagation for a given desired read range.

Figure 4:
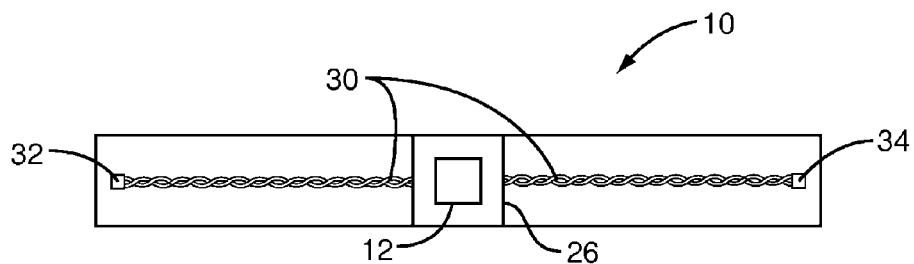
FIG. 4 illustrates an exemplary top view of the low and narrow-profile RFID device of FIG. 3 employing a dipole braided wire antenna for improved read range performance, according to an embodiment of the subject matter described herein.

FIG. 4 illustrates an exemplary top view of a chip carrier package embodiment of the low and narrow-profile RFID tag 10 where the dipole antenna 14 includes a dipole braided wire antenna 30. The dipole braided wire antenna 30 provides an increased current carrying capability for a given diameter relative to the dipole wire antenna 28 due to the increased surface area for current conduction over the surface of the braids of the dipole braided wire antenna 30. Furthermore, a braided wire antenna, such as the braided wire antenna 28, may be used with any wireless communication device and provides increased flexibility over a conventional wire antenna without increasing stress on antenna connections for the wireless communication device. As with the dipole wire antenna 28, the dipole braided wire antenna 30 may be dimensioned of an appropriate gauge to provide adequate signal propagation for a given desired read range. For example, a gauge of eighteen for the dipole braided wire antenna 30 was found to provide a 3 dB increase relative to a gauge of twenty-four in a single wire formed into a spring, which is described in association with FIG. 5 below. The dipole braided wire antenna 30 may include tabs 32 and 34 at its ends. However, it should be noted that the tabs 32 and 34 are optional and are illustrated within FIG. 4 to show where the tabs 32 and 34 may be placed if optionally used. The tabs 32 and 34 may be useful for maintaining integrity of the braided ends, but may also used for tuning the length of the dipole braided wire antenna 30 for frequency response.

Figure 5:
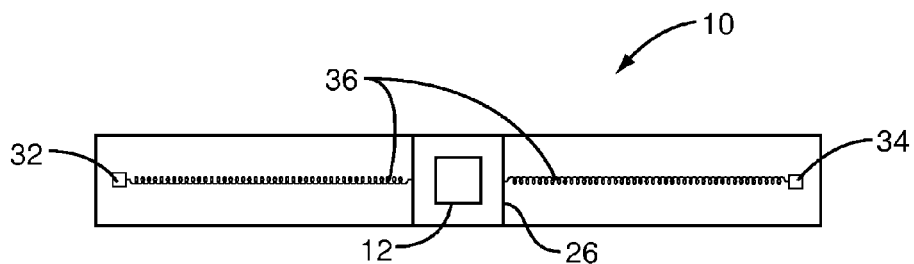
FIG. 5 illustrates an exemplary top view of the low and narrow-profile RFID device of FIG. 3 employing a dipole spring wire antenna to improve flexibility of the RFID device.

FIG. 5 illustrates an exemplary top view of a chip carrier package embodiment of the low and narrow-profile RFID tag 10 with a dipole spring wire antenna 36. The dipole spring wire antenna 36 allows for increased flexibility of the RFID tag 10 with potentially decreased fatigue of the mechanical integrity of the dipole spring wire antenna 36 relative to other embodiments, as described above. However, the dipole spring wire antenna 36 has not been shown to have the increased read signal strength of those embodiments. As with the embodiment of FIG. 4, the tabs 32 and 34 may be optionally included with the dipole spring wire antenna 36 and, if used, may be useful for tuning the length of the dipole spring wire antenna 36 for frequency response.

It should be noted that any antenna embodiment used without a circuit board may provide electrical connectivity between the respective dipole antenna and the chip carrier package 12 by direct solder connections to terminals or leads of the chip carrier package 12 which bond out antenna connections to the RFID circuitry within the chip carrier package 12. Furthermore, any antenna embodiment, such as an asymmetrical dipole antenna or a monopole antenna, may be used with a circuit board, as described in association with FIG. 2 above. In such an embodiment, electrical connectivity may be provided between the respective dipole antenna and the chip carrier package by direct solder connections to traces, vias, or pads which electrically connect to terminals or leads of the chip carrier package which bond out antenna connections to the RFID circuitry within the chip carrier package.

Figure 6:
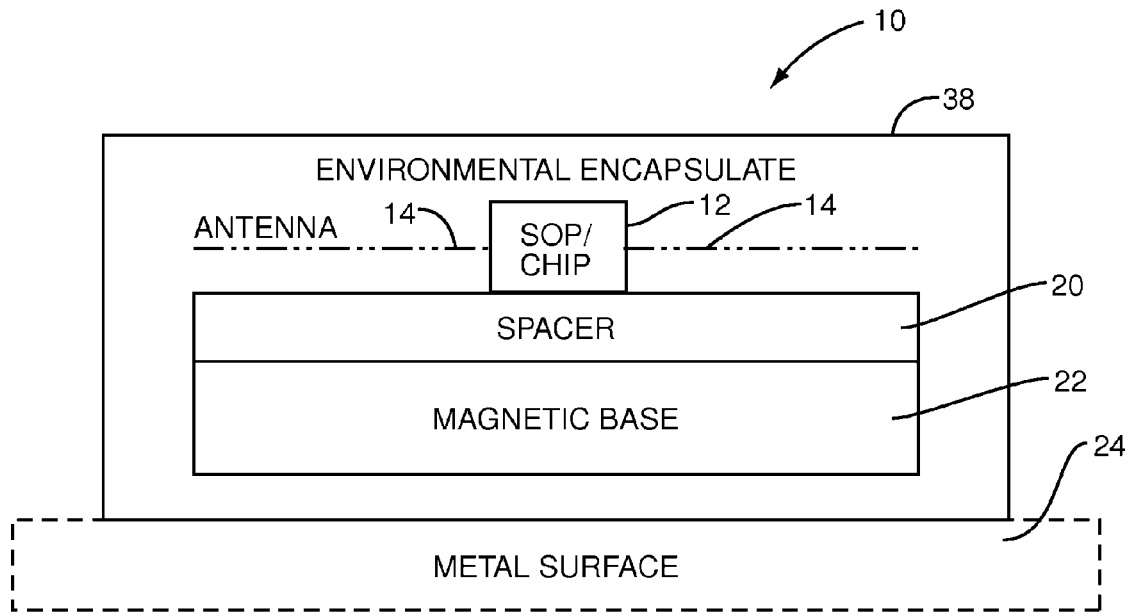
FIG. 6 illustrates the low and narrow-profile RFID device of FIG. 1 with an environmental encapsulate forming a boundary to shield the RFID device from penetration of environmental contaminants, water, temperature, and impact according to an embodiment of the subject matter described herein.

FIG. 6 illustrates an exemplary chip carrier package embodiment of the low and narrow-profile RFID tag 10 with an environmental encapsulate 38 forming a boundary to shield the RFID tag 10 from penetration of environmental contaminants, water, temperature, and impact. The environmental encapsulate 38 may take many forms, as will be described in more detail beginning with FIG. 10 below. It should be noted that the environmental encapsulate 38 encapsulates all components of the RFID tag 10. It should further be noted that the environmental encapsulate 38 or any variant thereof may be used to protect any wireless communication electronics, and that the environmental encapsulate 38 or any variant thereof is not limited to use with an RFID tag.

Figure 7:
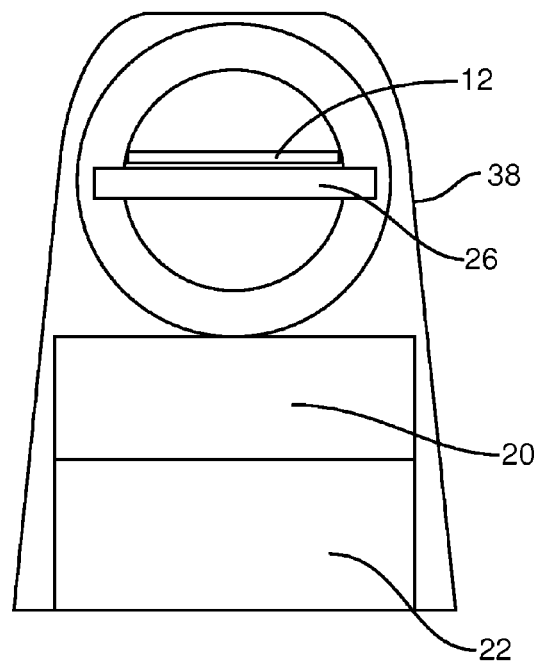
FIG. 7 illustrates an exemplary cross section of the low and narrow-profile RFID device of FIG. 6.

FIG. 7 illustrates an exemplary cross section of a chip carrier package embodiment of the low and narrow-profile RFID tag 10 with an environmental encapsulate 38 forming a boundary to shield the RFID tag 10 from penetration of environmental contaminants, water, temperature, and impact. FIG. 7 illustrates that the environmental encapsulate 38 does not need to encapsulate the bottom of the magnetic-base 22 to provide shielding effects from penetration of environmental contaminants, water, temperature, and impact. Furthermore, without encapsulating the bottom of the magnetic-base 22, the dielectric constant balance between the spacer material 20 and the magnetic-base 22 relative to the metal surface 24 (not shown) may be maintained. However, the bottom of the RFID tag 10 may be encapsulated without departure from the scope of the subject matter described herein. Additionally, it should be noted that the environmental encapsulate 38 may be of any suitable dimension relative to the form factor of the RFID tag 10.

Figure 8:
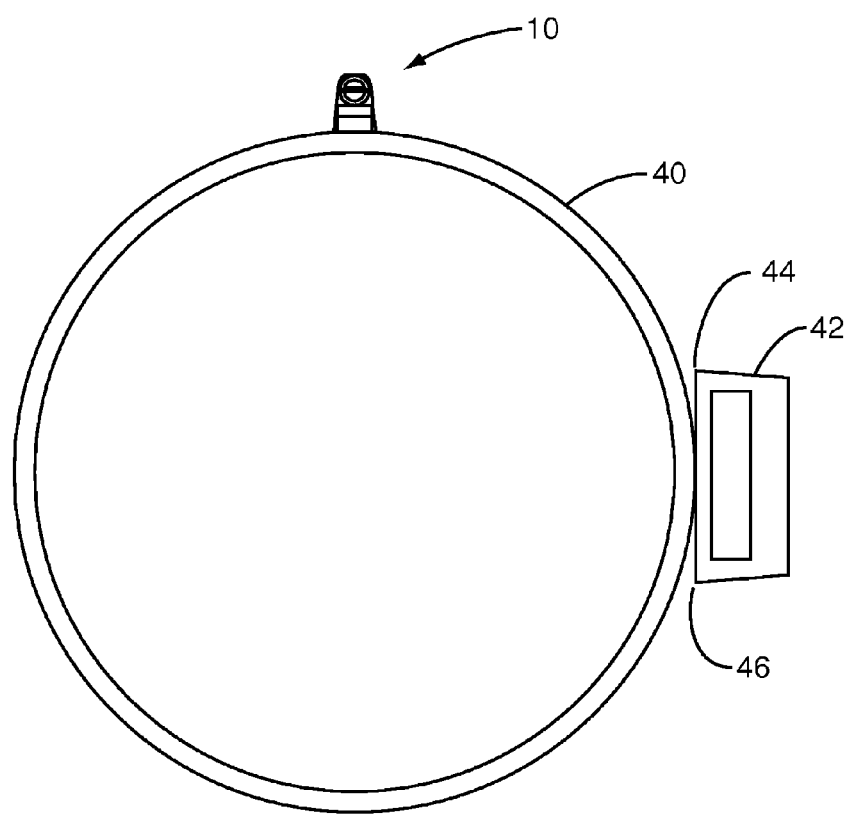
FIG. 8 illustrates an exemplary cross section of a metal pipe tagged with the low and narrow-profile RFID device of FIG. 7 according to an embodiment of the subject matter described herein.

FIG. 8 illustrates an exemplary cross section of a metal pipe 40 detailing relative dimensional differences between the low and narrow-profile RFID tag 10 of the present invention and a conventional metal tag 40. The metal pipe 40 is illustrated with the conventional metal tag 42 in contact with a surface of the metal pipe 40. The bottom edges of the conventional metal tag 42 do not contact the surface of the metal pipe 40 at its corners 44 and 46 due to the dimensional dissimilarity between the conventional metal tag 42 and the metal pipe 40. In contrast, the RFID tag 10 contacts the metal pipe 40 along its entire width. This improved contact with the surface of the metal pipe 40 along with the smaller dimensions of the RFID tag 10 relative to the conventional metal tag 42 is believed to contribute to increased performance of the RFID tag 10 when compared to the conventional metal tag 42. Additionally, flexibility of the spacer material 20 and the magnetic-base material 22 contribute to improved contact with the metal pipe 40 and allow for improved fastening of the RFID tag 10 to the metal pipe 40 when adherents, such as glue, are used to fasten the RFID tag 10 to the metal pipe 40.

Figure 9:
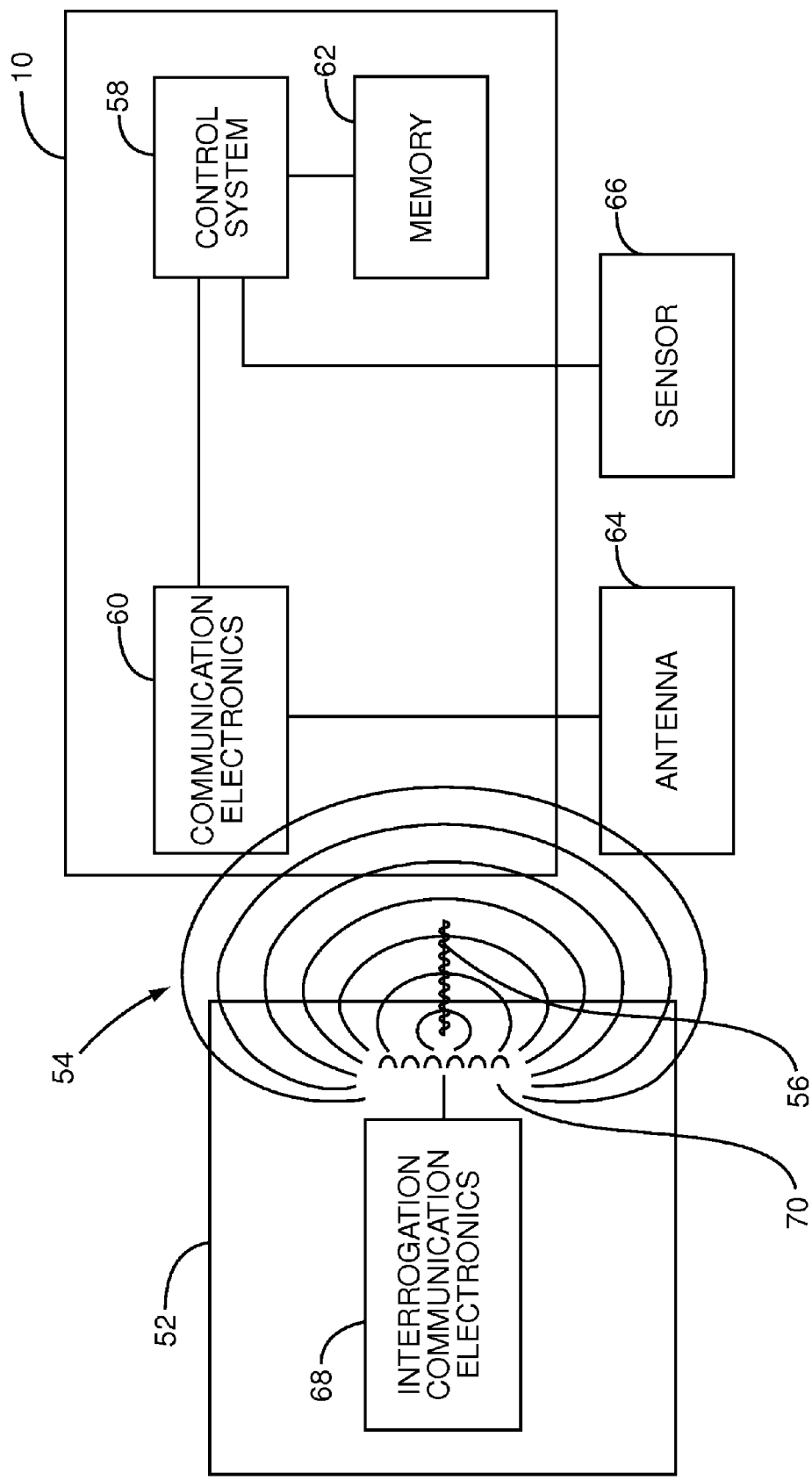
FIG. 9 illustrates a block diagram of an exemplary communication system for communication between a wireless device, such as a low and narrow-profile RFID tag, and an interrogator according to an embodiment of the subject matter described herein.

FIG. 9 illustrates a block diagram of an exemplary communication system 50 for communication between a wireless device, such as the low and narrow-profile RFID tag 10, and an interrogator 52. The present invention includes the RFID tag 10 for electronic communication. Some embodiments of the RFID tag 10 have both a transmitter and receiver. Other embodiments of the RFID tag 10, known in the art as "transponders," are interrogated by the interrogator 52, whereby the transponder communicates back by altering a field 54 containing an interrogation signal 56. This description refers to the terms "transponder," wireless communication device, and the RFID tag 10 interchangeably, and the use of the term transponder is not intended to limit the type of wireless communication device applicable to the present invention. Wireless communication devices are available that communicate at various frequencies, including ultra high frequency (UHF) and very high frequency (VHF). One embodiment of the present invention uses the RFID tag 10 that is a passive radio-frequency device with the ability to rectify incoming radio energy and provide power to power the device for communication and operation. The present invention is also applicable to active devices that have their own power source for communications. It should be readily understood to one of ordinary skill in the art that there are many different types of wireless communication devices that allow electronic communication and thus the present invention is not limited to any one particular type.

The low and narrow-profile RFID tag 10 includes a control system 58 and communication electronics 60. The RFID tag 10 may also include a memory 62 for storage of information to be communicated to the interrogator 52. Alternatively, the RFID tag 10 may store information such as an identification number or other information by using diodes, dip switches, or some other like circuitry in lieu of the memory 62. An antenna 64 is provided to receive the interrogation signal 56 from the interrogator 52. The antenna 64 may be the dipole antenna 14 or any other antenna embodiment and may be either external to or internal to the RFID tag 10. The particular type and location of the antenna 64 will depend on the operating frequency of the RFID tag 10 and the particular design desired. The RFID tag 10 may also be connected to a sensor 66 for sensing ambient or environmental information surrounding the RFID tag 10. One example of the sensor 66 may be a quartz crystal resonator like that described in U.S. Pat. No. 5,922,550, entitled "BIOSENSING DEVICES WHICH PRODUCE DIFFRACTION IMAGES" to Everhart et al., which is incorporated herein by reference in its entirety. A quartz crystal resonator detects analytes that may be present in food. Analytes include, but are not limited to, microorganisms such as bacteria, yeasts, fungi, and viruses.

The antenna 64 receives the interrogation signal 56 through the radiated interrogation field 54. The antenna 64 passes received interrogation signals 56 to the communication electronics 60. The communication electronics 60 includes circuitry necessary to interpret the interrogation signal 56 from the field 54 and to further communicate the interpreted interrogation signal 56 to the control system 58. The control system 58 may include an integrated circuit, printed circuit board, or other type of microprocessor or micro-controller electronics that controls the operations of the RFID tag 10. The control system 58 is connected to the communication electronics 60 to communicate and receive transmissions. The control system 58 is also connected to the memory 62 for storing and retrieving information. The control system 58 may further include a clock (not shown). The control system 58 determines if any actions are needed in response to the communications received from the communication electronics 60.

FIG. 9 also illustrates how communication is achieved with the low and narrow-profile RFID tag 10 using the interrogator 52. The interrogator 52 includes interrogation communication electronics 68 and an interrogation antenna 70. The interrogation reader 52 communicates with the RFID tag 10 by emitting the interrogation signal 56 modulated in a frequency by the interrogation communication electronics 68 through the interrogation antenna 70. The interrogation antenna 70 may be any type of antenna that can radiate the interrogation signal 56 through the field 54 so that a compatible device, such as the low and narrow-profile RFID tag 10, can receive the signal 56 through its own antenna 64. The field 54 could be electro-magnetic, magnetic, or electric. The interrogation signal 56 includes a message containing information or a specific request for the RFID tag 10.

When the antenna 64 is in the presence of the field 54 emitted by the interrogator 52, the communication electronics 60 are energized by the signal 56, thereby energizing the RFID tag 10. The RFID tag 10 remains energized so long as the antenna 64 is in the field 54 of the interrogator 52. The communication electronics 60 demodulates the interrogation signal 56 and sends the message containing the information or the specific request to the control system 58 for appropriate actions. For example, the request may be for the RFID tag 10 to communicate its identification, or information about a material or package associated with the RFID tag 10, such as date of manufacture, place of manufacture, and/or lot number. The message may also be a request for information regarding ambient or environmental measurements sensed by the sensor 66.

Another description of the RFID tag 10 that may be used with the present invention is located in U.S. Pat. No. 5,347,280, entitled "FREQUENCY DIVERSITY TRANSPONDER ARRANGEMENT" to Schuermann, which is incorporated herein by reference in its entirety. The RFID tag 10 is one type of wireless communication device. Other types of wireless communication devices may be used with the present invention. For instance, the low and narrow-profile RFID tag 10 may have a transmitter that can send information to the interrogator 52 without having to alter the interrogation signal 56. The RFID tag 10 may include a battery (not shown) to power the transmitter, or an energy storage unit (not shown) that is charged by energy received from the interrogation signal 56 when the RFID tag 10 is within range of the field 54. It is readily understood to one of ordinary skill in the art that there are many other types of wireless communications devices and communication techniques than those described herein, and the present invention is not limited to a particular type of device, technique, or method.

The RFID tag 10 may be attached to any type of device or package to identify and communicate information concerning the device or package. For instance, the RFID tag 10 may be attached to a food package and may contain identification information and other information about the food contained inside the package, such as its date of manufacture, "born on" date, expiration date for sale, or consumption and lot number. For example, the RFID tag 10 may be attached to a wine bottle and contain information concerning the type of wine and its ingredients or make up, the date of manufacture, and the expiration date. The RFID tag 10 may be attached to virtually any device or package conceivable, and is particularly well suited for use in applications including a metal surface or irregularly-shaped product package.

Further enhancements to the RFID tags 10 of the present invention are possible. Environmental contaminants, water, temperature, and impact can affect the functionality and usable life of an electronic device. As such, the embodiments that follow describe various exemplary environmental encapsulates that may be used to protect the RFID tag 10 of the present invention from environmental contaminants, water, temperature, and impact.

Figure 10:
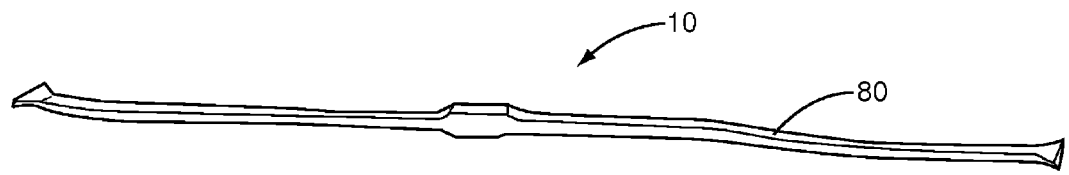
FIG. 10 illustrates an exemplary low and narrow-profile RFID device encapsulated within a shrink wrap material to shield the low and narrow-profile RFID device from environmental contaminants, water, temperature, and impact according to an embodiment of the subject matter described herein.

FIG. 10 illustrates an exemplary low and narrow-profile RFID device encapsulated within a shrink wrap material 80 to shield the low and narrow-profile RFID tag 10 from environmental contaminants, water, temperature, and impact. The shrink wrap material 80 encapsulates the entire RFID tag 10 and may be any commercially-available shrink wrap material, such as a heat shrink-type material that used within the electronics industry. The shrink wrap material 80 may be placed over the RFID tag 10 and activated by heating to cause the shrink wrap material 80 to shrink and seal against the contours of the RFID tag 10. The ends of the shrink wrap material 80 are sealed to prevent contamination of the RFID tag 10.

Figure 11:
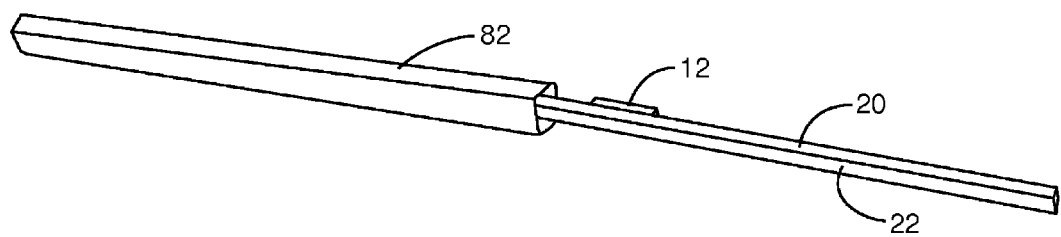
FIG. 11 illustrates an exemplary low and narrow-profile RFID device encapsulated within a pre-molded case to shield the low and narrow-profile RFID device from environmental contaminants, water, temperature, and impact according to an embodiment of the subject matter described herein.

FIG. 11 illustrates an exemplary low and narrow-profile RFID device encapsulated within a pre-molded case 82 to shield the low and narrow-profile RFID tag 10 from environmental contaminants, water, temperature, and impact. The use of the pre-molded case 82 may further increase rigidity of the RFID tag 10. The ends of the pre-molded case 82 are sealed to prevent contamination of the RFID tag 10. The RFID tag 10 may alternatively be encapsulated with shrink wrap, such as the shrink wrap material 80, prior to placement within the pre-molded case 82 for additional protection from the elements.

Figure 12:
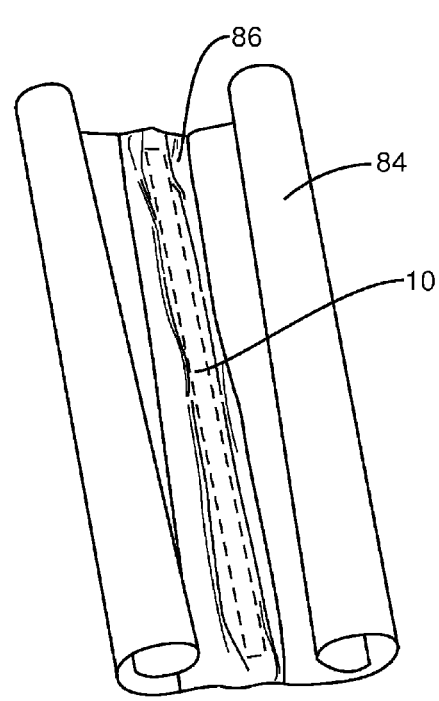
FIG. 12 illustrates an exemplary rapid-wrap packaging embodiment of a low and narrow-profile RFID device according to an embodiment of the subject matter described herein.

FIG. 12 illustrates an exemplary rapid-wrap packaging embodiment of the low and narrow-profile RFID tag 10. A rapid-wrap packaging 84 provides a method of attachment of the RFID tag 10 to tubing and other round surfaces. By packaging the RFID tag 10 with the rapid-wrap packaging 84, the RFID tag 10 may be installed on tubular surfaces and the rapid-wrap packaging 84 may be used to hold the RFID tag 10 to the tubular surface without additional fasteners if desired. The rapid-wrap packaging 84 recoils when released after being unrolled. As such, the rapid-wrap packaging 84 with the RFID tag 10 attached to its inner surface may be attached to a cylindrical surface by unrolling, at least partially, the rapid-wrap packaging 84, placing a first edge of the at least partially unrolled rapid-wrap packaging 84 onto the cylindrical surface, and allowing the rapid-wrap packaging 84 to recoil around the cylindrical surface to attach the RFID tag 10 to the cylindrical surface. Tape 86 secures the RFID tag 10 to the inside curved surface of the rapid-wrap packaging 84. The RFID tag 10 may alternatively be encapsulated with an environmental encapsulate prior to securing the RFID tag 10 to the inside curved surface of the rapid-wrap packaging 84. The environmental encapsulate may be used, as elsewhere described herein, to shield the RFID tag 10 from environmental contaminants, water, temperature, and impact.

Figure 13:
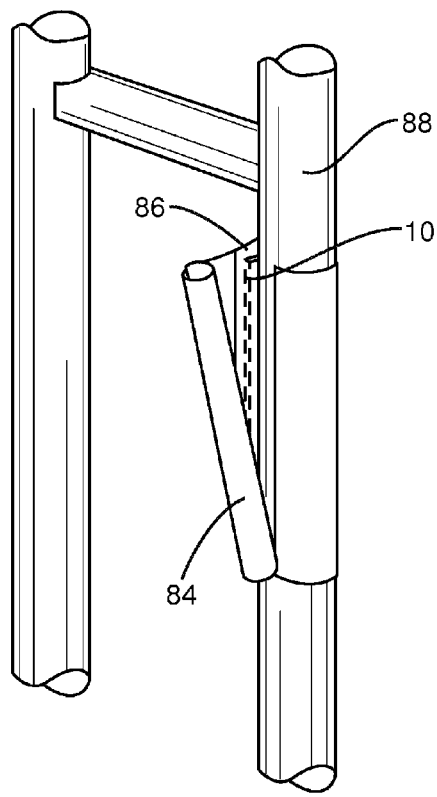
FIG. 13 illustrates an exemplary rapid-wrap packaging embodiment of a low and narrow-profile RFID device attached to a section of scaffolding to identify the section of scaffolding according to an embodiment of the subject matter described herein.

FIG. 13 illustrates an exemplary rapid-wrap packaging embodiment of the low and narrow-profile RFID tag 10 attached to a section of scaffolding 88 to identify the section of scaffolding 88. The rapid-wrap packaging 84 has been secured to the section of scaffolding 88 with the RFID tag 10 attached to the inside curved surface of the rapid-wrap packaging 84. The rapid-wrap packing 84 curves onto itself to allow quick fastening of the RFID tag 10 to the scaffolding 88. Due to the curved cylindrical nature of the rapid-wrap packaging 84 and the fact that it curves onto itself, the RFID tag 10 may remain in place on the section of scaffolding 88 without additional mechanical fasteners. However, tape, glue, or another fastener may be used to further secure the RFID tag 10 to the section of scaffolding 88 as desired.

Figure 14:
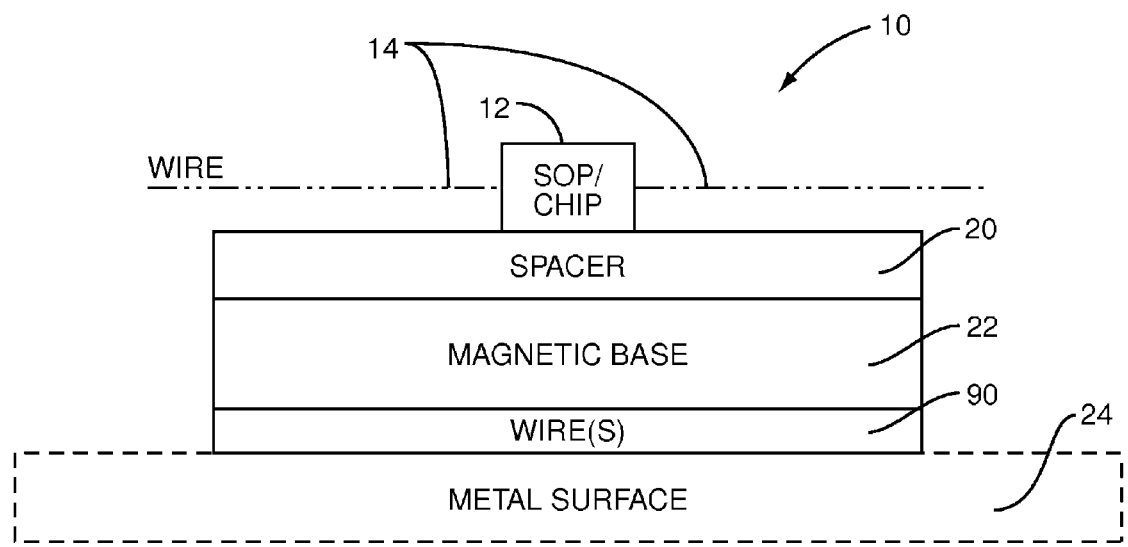
FIG. 14 illustrates an exemplary low and narrow-profile RFID device with curve set capabilities provided by placing one or more wires beneath the magnetic base of the low and narrow-profile RFID device to allow the device to be shaped into a contour of a surface and to hold the shape, thereby reducing stress on fastening materials according to an embodiment of the subject matter described herein.

FIG. 14 illustrates an exemplary low and narrow-profile RFID tag with curve set capabilities provided by placing one or more wires 90 beneath the magnetic-base material 22 of the low and narrow-profile RFID tag 10 to allow the RFID tag 10 to be shaped into a contour of a surface, such as the metal surface 24, and to hold the contoured shape, thereby reducing stress on fastening materials. The wire(s) 90 may be of any suitable gauge to allow the curve set capabilities of the RFID tag 10 to maintain contoured shape of the surface to which it is to be attached. Although not depicted in FIG. 14, an environmental encapsulate, such as the environmental encapsulate 38, may be formed to shield the RFID tag 10 from environmental contaminants, water, temperature, and impact.

Figure 15:
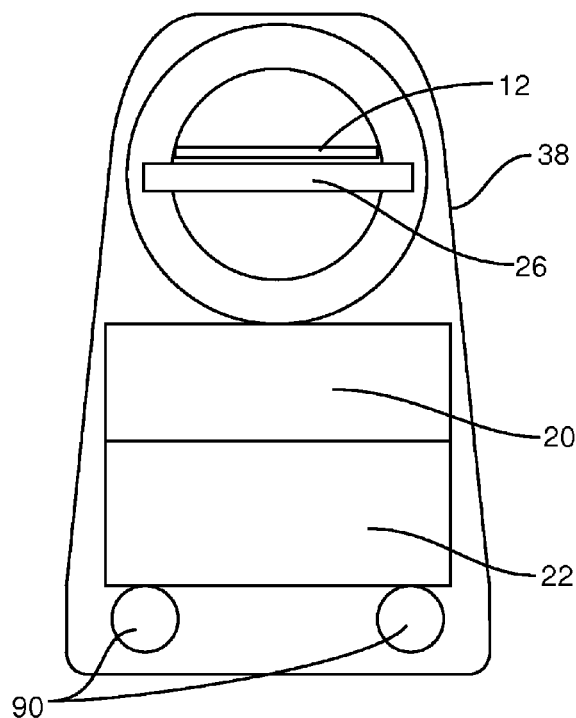
FIG. 15 illustrates an exemplary cross section of the low and narrow-profile RFID device of FIG. 14.

FIG. 15 illustrates an exemplary cross section of a low and narrow-profile RFID tag with curve set capabilities showing two wires 90 beneath the magnetic-base material 22 of the low and narrow-profile RFID tag 10 to allow the device to be shaped into a contour of a surface and to hold the shape, thereby reducing stress on fastening materials. As such, the RFID tag 10 may be formed into the shape of an uneven surface with one or more contours to allow the RFID tag 10 to create a smaller obtrusion from the surface of the object to be tagged. The RFID tag's 10 capability of being formed to fit in close contact with the surface of the object to be tagged reduces contact with the RFID tag 10 during shipping and storage and less lateral force may be imparted to the RFID tag 10 if an object does come into contact with the RFID tag 10. The environmental encapsulate 38 is formed around the RFID tag 10 with the two wires 90 beneath the magnetic-base material 22. Accordingly, the two wires 90 form an integral part of the RFID tag 10. It should be noted that any number of wires may be used within an embodiment such as that described within FIG. 15, provided that the gauge selection of the chosen number of wires is such that the curve set capabilities are provided. Furthermore, the environmental encapsulate 38 is illustrated as encapsulating the wires 90. The wires 90 may alternatively be fastened to the exterior of the RFID tag 10.

Figure 16:
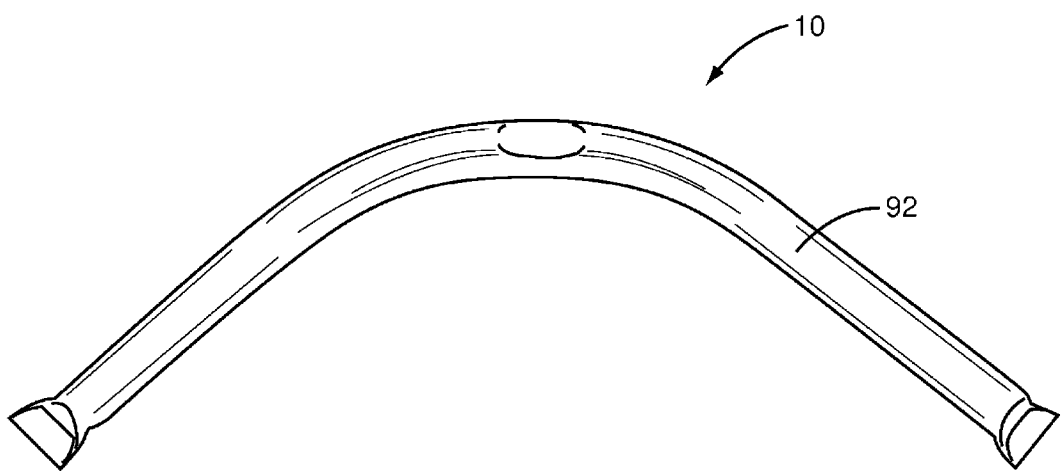
FIG. 16 illustrates an exemplary bent low and narrow-profile RFID device of FIG. 10.

FIG. 16 illustrates an exemplary low and narrow-profile RFID tag with curve set capabilities and a heat shrink encapsulate 92 bent into an arc for placement on a curved surface. The heat shrink encapsulate 92 is an exemplary embodiment of the shrink wrap material 80 described in association with FIG. 10 above and may be any commercially available product that shrinks when heat is applied to cause the heat shrink encapsulate 92 to form to a surface. The low and narrow-profile RFID tag 10 with curve set capabilities maintains its shape and bend to reduce stress on mechanical fasteners. Further, the RFID tag 10 may be placed within the rim of hats or helmets, on a curved cylinder surface, and any other uneven surface. The ends of the heat shrink encapsulate 92 are crimped to further protect the RFID tag 10.

Figure 17:
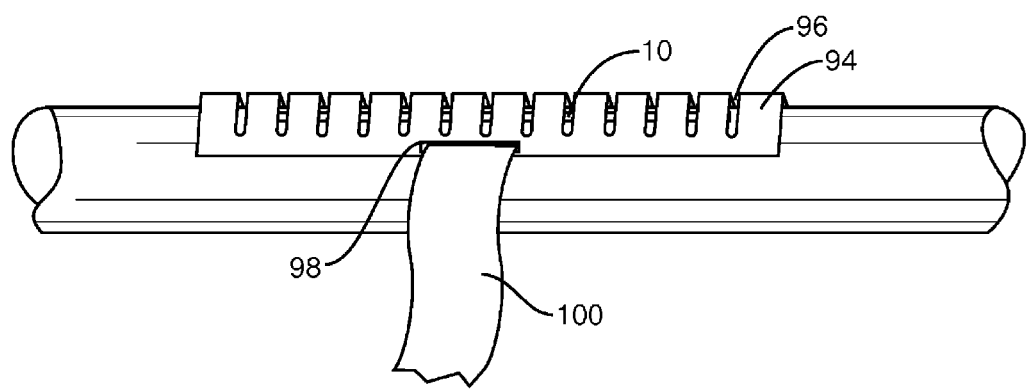
FIG. 17 illustrates an exemplary low and narrow-profile RFID device with a slotted mechanical impact barrier providing additional protection from impact with the slots providing signaling pathways through the angle iron according to an embodiment of the subject matter described herein.

FIG. 17 illustrates an exemplary low and narrow-profile RFID tag 10 with a slotted mechanical impact barrier 94 providing additional protection from impact with slots 96 providing signaling pathways through the slotted mechanical impact barrier 94. The embodiment depicted within FIG. 17 is particularly well suited for harsh situations, such as construction situations, which may threaten the mechanical integrity of the RFID tag 10. By use of a mechanical barrier, such as the slotted mechanical impact barrier 94, RF performance may be maintained for the RFID tag 10 while improving mechanical impact resistance significantly relative to both conventional RFID tags and embodiments without a slotted mechanical impact barrier 94. The present embodiment provides the slots 96, which are cut at intervals along a length of the slotted mechanical impact barrier 94, to provide spacing sufficient to reduce an RFID shielding effect that would otherwise result from a metal covering of the RFID tag 10. As such, a useable RFID signal level and read performance may be maintained while mechanically protecting the RFID tag 10. Exemplary spacing for the slots 96 include spacing such as ½", 1", and ¾", etc. It should be noted that slotted mechanical impact barriers of any shape may be used, such as angle iron, rectangular tubing, or cylindrical tubing, for example, depending upon the desired application. Accordingly, any such shape is considered within the scope of the subject matter described herein.

The low and narrow-profile RFID tag 10 may be directly attached to the underside of a mechanical impact barrier, such as the slotted mechanical impact barrier 94, and may realize similar read performance as when the RFID tag 10 is mounted directly to the surface of an object to be tagged. Further, it is anticipated that the surface of the slots 96 may actually enhance the RF performance of the RFID tag 10 in addition to allowing RF energy to leak into the space under the slotted mechanical impact barrier 94 to allow communication with the RFID tag 10. The RFID tag 10 may be fasted to the underside of the slotted mechanical impact barrier 94 by any suitable means, including tape, glue, or any other fastener.

The slotted mechanical impact barrier 94, including the RFID tag 10, may be attached to a surface to be identified, such as a construction pipe, by direct welding, metal or fiber straps, a rugged tape of belts, or any other fastener suitable for use with the mounting surface. An alternative means to attaching the slotted mechanical impact barrier 94, including the RFID tag 10, to an object to be identified is to cut a pair of horizontal slots 98 (one shown within FIG. 17) just above the base of the slotted mechanical impact barrier 94. The horizontal slot 98 will allow a strap 100 to be passed through the horizontal slots 98 at the base and then around the object to be identified. Accordingly, the strap 100 may remain close to the object as it bands the slotted mechanical impact barrier 94, including the RFID tag 10, to the object.

Accordingly, many approaches to attaching the RFID tag 10 to the slotted mechanical impact barrier 94 and for attaching the slotted mechanical impact barrier 94, including the RFID tag 10, to an object are possible. For a further example, the RFID tag 10 may be strapped to the object to be identified and the slotted mechanical impact barrier 94 may be strapped to the object over the strapped RFID tag 10. Alternatively, as described above, the RFID tag 10 may include a slot for strapping the RFID tag 10 to an object to be identified. In such an embodiment, a strap may then be passed through a first of the horizontal slots 98 in the slotted mechanical impact barrier 94, then through the slot in the RFID tag 10 as described above, and then through the second of the horizontal slots 98 in the slotted mechanical impact barrier 94 to couple the RFID tag 10 to the mechanical impact barrier 94. This assembly may then be strapped to the object to be identified, such as a construction pipe or other surface, to secure the mechanical impact barrier 94 and the RFID tag 10 to the surface. An approach which uses a horizontal slot 98 may prevent the strapping material from wearing or breaking due to mechanical abrasion of the strapping material against the slotted mechanical impact barrier 94 or another surface during shipping or storage of the object to be identified.

As another alternative, the slots 96 may either be left open or may be filled with filler such as silicone, epoxy, or the like to add further environmental protection to the RFID tag 10. Such an embodiment may prevent sludge, mud, and debris from plugging the slots 96. These fillers are known not to interfere with RF energy. As such, the RFID tag 10 may be further protected from environmental conditions while maintaining sufficient RF read performance.

Figure 18:
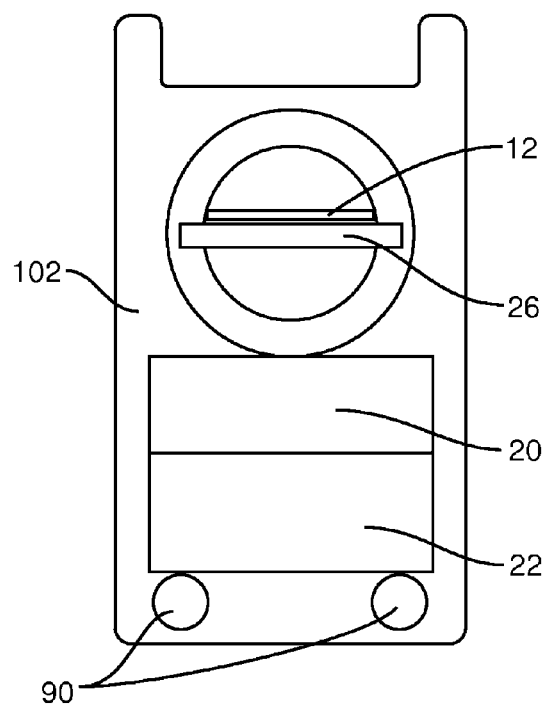
FIG. 18 illustrates an exemplary cross section of a low and narrow-profile RFID device with a rubber encapsulate, such as vulcanized rubber, to provide additional impact protection in addition to environmental encapsulation according to an embodiment of the subject matter described herein.

FIG. 18 illustrates an exemplary cross section of a low and narrow-profile RFID tag 10 with a rubber encapsulate 102, such as polyurethane, vulcanized rubber, or a similar material, to provide additional mechanical impact protection in addition to environmental encapsulation. An additional benefit to use of the rubber encapsulate 102 is flexibility of the RFID tag 10 for installation purposes. As such, the RFID tag 10 may be mounted around the circumference of a round surface, such as a pipe or gas cylinder, or on a curved surface. Furthermore, in combination with the curve set capabilities described above, forces imparted to fastening materials may be reduced. The rubber encapsulate 102, including the RFID tag 10, may be strapped directly to an object to be identified, or may be used in conjunction with the slotted mechanical impact barrier 94 described above in association with FIG. 17.

Figure 19:
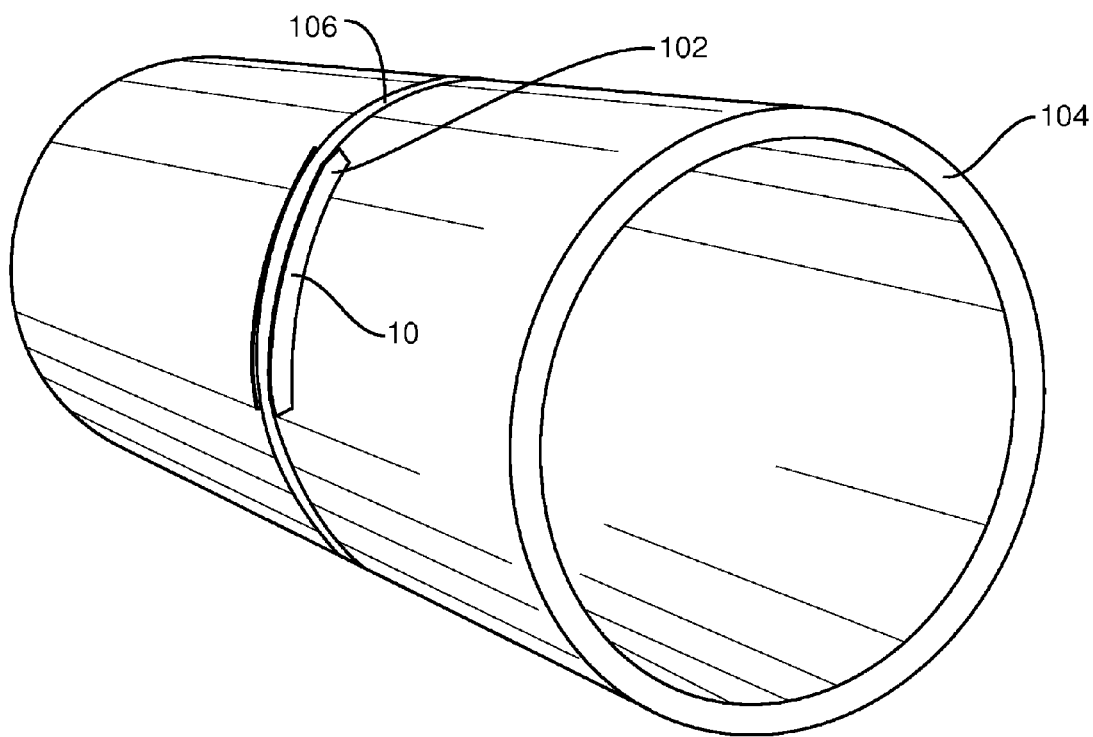
FIG. 19 illustrates an exemplary low and narrow-profile RFID device with a rubber encapsulate, such as vulcanized rubber, attached to a piece of pipe with a strap according to an embodiment of the subject matter described herein.

FIG. 19 illustrates an exemplary low and narrow-profile RFID tag 10 with the rubber encapsulate 102, such as vulcanized rubber, attached to a piece of pipe 104 with a strap 106. As described above, curve set capabilities may be combined with the vulcanized rubber embodiment to provide the RFID tag 10 with the capability of retaining the shape of the surface to which it is to be attached. Alternatively, in addition to the embodiment illustrated within FIG. 19 where mounting is circumferential, the RFID tag 10 encapsulated within the rubber encapsulate 102 may be attached to the pipe 104 axially with respect to the pipe 104.

Figure 20:
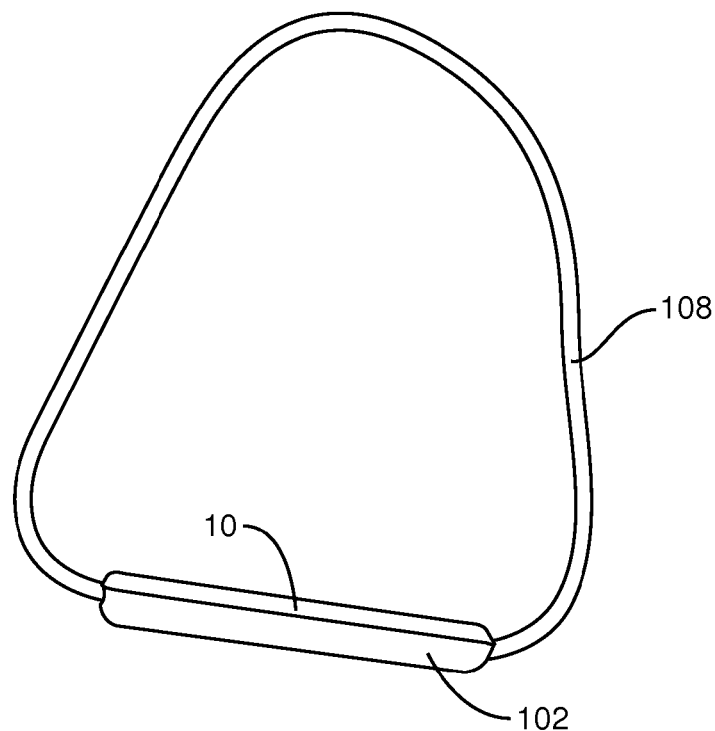
FIG. 20 illustrates an exemplary low and narrow-profile RFID device with a rubber encapsulate, such as vulcanized rubber, and an integrated o-ring for allowing the RFID device to be readily attached to a round or other-shaped surface according to an embodiment of the subject matter described herein.

FIG. 20 illustrates an exemplary low and narrow-profile RFID tag 10 with the rubber encapsulate 102, such as vulcanized rubber, and an integrated o-ring 108 for allowing the device to be readily attached to a round or uneven surface. The integrated o-ring 108 may be dimensioned for the desired diameter or cross-section of the object to be identified. As such, integrated o-rings 108 of different sizes may be provided for attachment to objects of varying diameter or cross-section size. The RFID tag 10 encapsulated within the rubber encapsulate 102 and the integrated o-ring 108 may be formed by including an existing o-ring 108 into a mold during formation and curing in the vulcanizing process.

Figure 21:
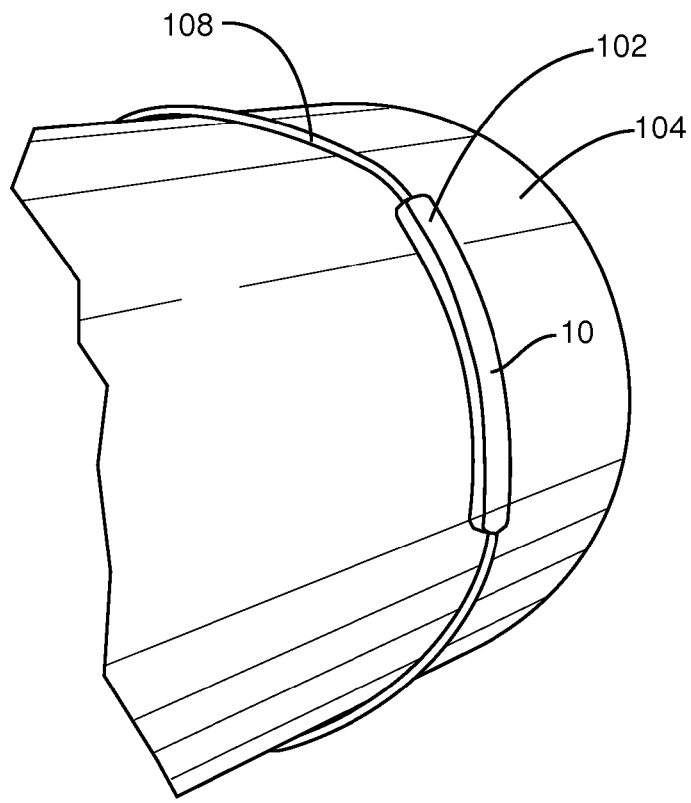
FIG. 21 illustrates the low and narrow-profile RFID device of FIG. 20 attached to a pipe.

FIG. 21 illustrates an exemplary low and narrow-profile RFID tag 10 with the rubber encapsulate 102, such as vulcanized rubber, and the integrated o-ring 108 attached to the pipe 104. The diameter of the pipe 104 matches with the selected dimension of the integrated o-ring 108 to minimize stress on the RFID tag 10 and the rubber encapsulate 102. Additionally, as described above, curve set capabilities may be integrated to further reduce stresses at attachment points and to increase conformity with curved surfaces.

Figure 22:
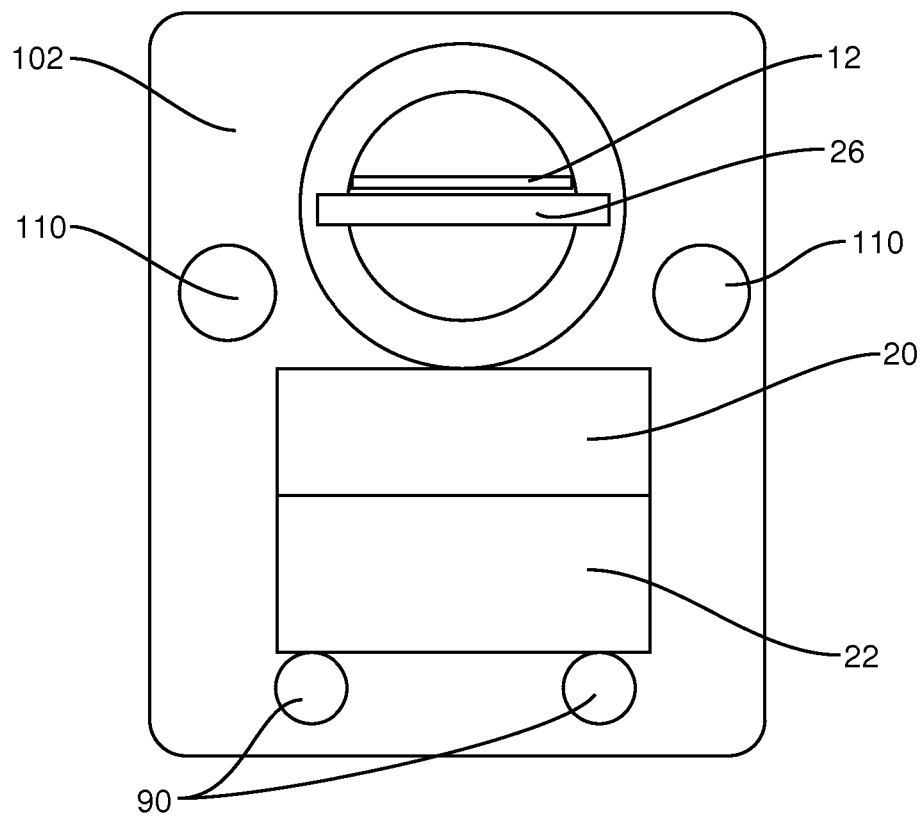
FIG. 22 illustrates an exemplary cross section of a low and narrow-profile RFID device within a rubber encapsulate, such as vulcanized rubber, with reinforced pre-hardened rubber strips placed along the length of the RFID device for additional impact protection according to an embodiment of the subject matter described herein.

FIG. 22 illustrates an exemplary cross section of the low and narrow-profile RFID tag 10 within the rubber encapsulate 102, such as vulcanized rubber, with reinforced pre-hardened rubber strips 108 placed along the length of the RFID tag 10 for additional impact protection. The reinforced pre-hardened rubber strips 110 placed along the length of the RFID tag 10 add additional lateral rigidity to the RFID tag 10. The wires 90 are illustrated to provide the curve set capabilities described above. Alternatively, the wires 90 may be left out of the embodiment as desired. Additionally, more wires 90 may be placed axially relative to the length of the RFID tag 10, including placing wires above or below the reinforced pre-hardened rubber strips 110 along the sides of the RFID tag 10 without departure from the scope of the subject matter described herein.

Figure 23:
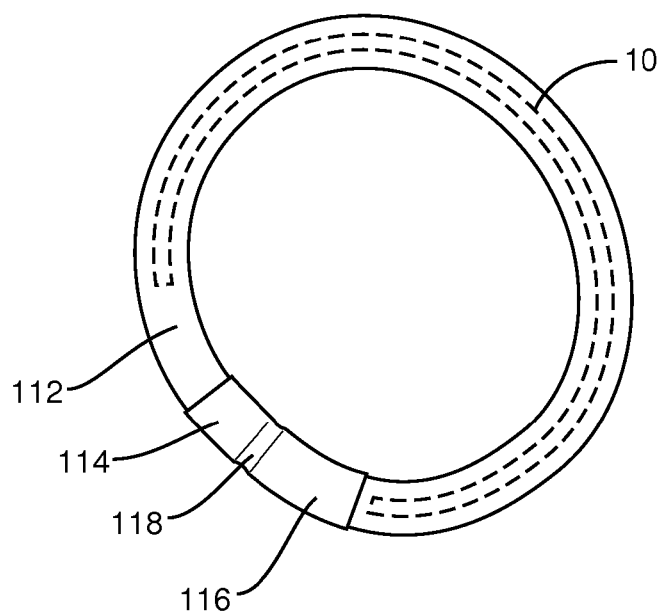
FIG. 23 illustrates an exemplary ring tag low and narrow-profile RFID device within a rubber encapsulate, such as rubber tubing, and formed into a ring for attachment to round objects of a given diameter according to an embodiment of the subject matter described herein.

FIG. 23 illustrates an exemplary ring tag low and narrow-profile RFID 10 device within a rubber encapsulate 112, such as rubber tubing, and formed into a ring for attachment to round objects of a given diameter. The rubber encapsulate 112 may be fastened at the ends 114 and 116 with a fastener 118. The fastener 118 may be tape, shrink wrap, or any other material capable of securing the ends 114 and 116 of the rubber encapsulate 112. The RFID tag 10 is placed inside of the rubber encapsulate 112 prior to sealing the ends and may be further protected by an environmental encapsulate, such as the environmental encapsulate 38, in the form of shrink wrap or another material, to enhance environmental ruggedness. Curve set capabilities, as described above, may be integrated into the RFID tag 10 to reduce stresses on the rubber encapsulate 112 and the fastener 118.

Within the foregoing description, many embodiments of the low and narrow-profile RFID tag 10 have been described. Many combinations of these embodiments are possible and all are considered within the scope of the subject matter described herein.

The Appendix to this specification includes the three provisional applications referenced above within the "Related Applications" section in their entirety and provides further details and alternate embodiments. The Appendix is incorporated herein by reference in its entirety.

Those skilled in the art will recognize improvements and modifications to the preferred embodiments of the present invention. All such improvements and modifications are considered within the scope of the concepts disclosed herein and the claims that follow.

What is claimed is:

1. A wireless communication device, comprising:
   wireless communication electronics;
   at least a first antenna connection coupled to the wireless communication electronics; and
   a braided wire antenna including at least a first braided conductive lead interfaced with the at least the first antenna connection;
   wherein the at least the first braided conductive lead includes a first and second end and, in being interfaced with the at least the first antenna connection, the at least the first braided conductive lead is interfaced at the respective first end; and
   wherein the second end of the at least the first braided conductive lead further comprises a metal tab, wherein the metal tab is adapted to be cut to allow frequency tuning of the wireless communication electronics.

2. The wireless communication device of claim 1 wherein the braided wire antenna further comprises a braided wire antenna selected from a group consisting of a monopole braided wire antenna and a dipole braided wire antenna.

3. The wireless communication device of claim 1 further comprising a circuit board upon which the wireless communication electronics are mounted and wherein the at least the first braided conductive lead is interfaced with the at least the first antenna connection via at least a first circuit connection on the circuit board.

4. The wireless communication device of claim 3 wherein the wireless communication electronics are coupled to a first side of a first spacer via the circuit board.

5. The wireless communication device of claim 1 further comprising at least one wire coupled to the wireless communication electronics and adapted to cause the wireless communication electronics to remain formed in a shape to which the at least one wire is bent.

6. The wireless communication device of claim 5 further comprising an environmental encapsulate adapted to enclose at least a portion of the at least one wire.

7. The wireless communication device of claim 1 further comprising an environmental encapsulate enclosing at least a portion of the wireless communication electronics and adapted to protect the wireless communication electronics from at least one of a contaminant, water, temperature, and impact.

8. The wireless communication device of claim 7 wherein the environmental encapsulate further comprises at least one of shrink wrap and a pre-mold case.

9. The wireless communication device of claim 7 wherein the environmental encapsulate further comprises a slotted mechanical impact barrier.

10. The wireless communication device of claim 9 wherein the slotted mechanical impact barrier is further adapted to allow radio frequency energy to pass through RF slots in the slotted mechanical impact barrier, and the RF slots are approximately perpendicular to a length of the slotted mechanical impact barrier.

11. The wireless communication device of claim 10 wherein the RF slots in the slotted mechanical impact barrier are filled with at least one of silicone and epoxy.

12. The wireless communication device of claim 9 wherein the slotted mechanical impact barrier further comprises at least one strap slot adapted to receive a strap useable for strapping the slotted mechanical impact barrier to an object to be identified, wherein the at least one strap slot is approximately parallel to a length of the slotted mechanical impact barrier.

13. The wireless communication device of claim 12 wherein the environmental encapsulate further comprises at least one encapsulate slot adapted to receive the strap, and the at least one encapsulate slot is approximately parallel to a length of the wireless communication electronics.

14. The wireless communication device of claim 7 wherein the environmental encapsulate further comprises vulcanized rubber.

15. The wireless communication device of claim 14 wherein the environmental encapsulate further comprises an o-ring integrated into the vulcanized rubber.

16. The wireless communication device of claim 14 wherein the environmental encapsulate further comprises reinforced pre-hardened rubber strips.

17. The wireless communication device of claim 7 wherein the environmental encapsulate further comprises a rubber encapsulate, wherein the wireless communication electronics and the rubber encapsulate are formed and secured to form a ring.

18. The wireless communication device of claim 17 wherein the wireless communication electronics and the rubber encapsulate are secured via at least one of tape and shrink wrap.

19. The wireless communication device of claim 7 wherein the environmental encapsulate further comprises a rolled flexible cylindrical material suitable for mounting the wireless communication electronics on a cylindrical surface.

20. The wireless communication device of claim 19 wherein the wireless communication electronics are mounted on an inside surface of the rolled flexible cylindrical material.

* * * * *